Figure 1:
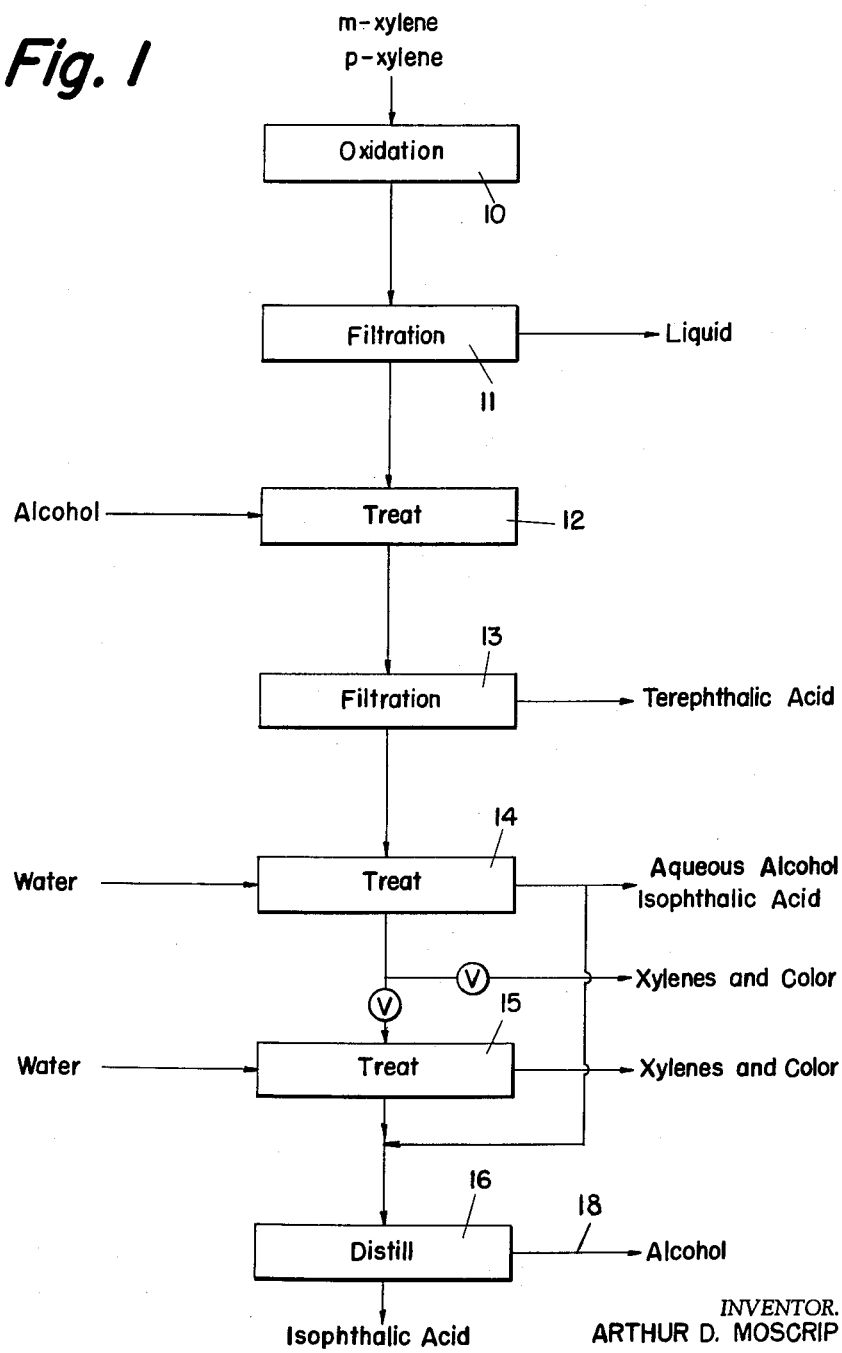

Feb. 6, 1962 A. D. MOSCRIP 3,020,312
PURIFYING PHTHALIC ACIDS
Filed Jan. 13, 1958 2 Sheets-Sheet 2

INVENTOR.
ARTHUR D. MOSCRIP
BY
ATTORNEY

3,020,312
PURIFYING PHTHALIC ACIDS
Arthur D. Moscrip, Swarthmore, Pa., assignor to Sun Oil Company, Philadelphia, Pa., a corporation of New Jersey
Filed Jan. 13, 1958, Ser. No. 708,657
8 Claims. (Cl. 260—524)

This invention relates to the purification of phthalic acids produced in the liquid phase partial oxidation of xylene.

It is known in the art to oxidize m-xylene, p-xylene or mixtures of the two in liquid phase with a metallic oxidation catalyst to produce a corresponding phthalic acid or mixture of phthalic acids. The temperature employed in such oxidations is usually within the approximate range from 250 to 400° F. The catalyst usually contains the metal cobalt, as for example cobalt naphthenate, cobalt toluate, cobalt acetate, etc.

The product obtained in such oxidation generally contains xylene, phthalic acid and small amounts of other materials including color bodies which are possibly polymeric materials produced during the oxidation. The usual procedure in working up the oxdiation products is to filter phthalic acid crystals from the liquid constituents of the oxidation product mixture. The filter cake obtained contains liquid material including xylene associated therewith.

It is known in the art to contact the filtered phthalic acids with a lower aliphatic alcohol, for example methanol, isopropanol, etc. in order to selectively dissolve an isophthalic acid concentrate in the alcohol. The undissolved terephthalic acid concentrate is then usually filtered from the alcohol solution of the isophthalic acid concentrate.

In order to recover isophthalic acid from the solution, the latter is distilled to remove alcohol and usually water which is associated therewith. The solution usually contains some xylene, which is also distilled in this operation and remains in the alcohol upon further use of the latter to contact additional phthalic acid filter cake. The isophthalic acid in the distillation residue usually has an amber color as a result of the presence therein of the color bodies referred to previously.

The xylene which is introduced into the isophthalic acid recovery system from the original filter cake tends to build up in the alcohol solvent, and it is often desirable to limit the amount of xylene in the solvent system. Also it is desirable to eliminate the poor color of the isophthalic acid obtained as product in conventional alcohol separation of phthalic acid isomers. These functions are accomplished in a novel and beneficial manner in the process according to the invention.

The invention involves in part the addition of water to a solution of isophthalic acid in alcohol, initially containing usually 5 to 15 volume percent of water, produced in the conventional contacting of phthalic acid filter cake with alcohol to selectively dissolve isophthalic acid. The addition of water causes the solution to separate into two immiscible layers. One of these layers contains primarily xylene and color bodies and represents a quite small proportion of the total material in the system at this point. The remaining material constitutes a solution of isophthalic acid in alcohol from which an isophthalic acid product having good color can be obtained by distillation of alcohol therefrom.

This solution contains xylene which is not precipitated by the addition of water, but the amount of xylene is reduced as compared with that in the solution prior to the addition of water, and the xylene which is separated as an immiscible layer contains the bulk of the color bodies previously in the system. On the other hand, the latter xylene contains only a small amount of phthalic acid, so that the loss of phthalic acid product is not excessive. This xylene can be recycled to the oxidation zone or it can be discarded from the system. Alternatively the xylene can be distilled therefrom and returned to the oxidation zone and the distillation residue discarded.

The process according to the invention provides superior decolorization of phthalic acid product to that obtainable by washing the filter cake with xylene prior to contacting the filter cake with alcohol. Furthermore the process according to the invention is advantageous in that it provides continuous or periodic removal of xylene from the alcohol system and thereby prevents undesirable buildup of the xylene concentration.

In some instances it may be desirable to add xylene or other hydrocarbon, as well as water, to the solution of isophthalic acid in alcohol. Such addition may be necessary in some instances in order to bring the composition of the liquid material in the system within the two phase portion of the ternary system hydrocarbon-water-alcohol. However in some instances the amount of xylene which is normally present is sufficient, and addition of xylene is unnecessary. The amount of xylene present in the contacting according to the invention is preferably in the range from 5 to 15 volume percent based on aqueous alcohol prior to addition of water. All, none, or any portion of this xylene may have been added after the formation of the alcohol solution of isophthalic acid.

The contacting of the phthalic acid filter cake with alcohol can be performed under any of the conditions which are known in the art for such operation. Usually the temperature of such contacting is within the approximate range from 50 to 300° F., and the weight ratio of alcohol to filter cake within the approximate range from 10:1 to 40:1. Methanol, isopropanol or other lower alcohol can be employed.

The subsequent contacting of the alcohol solution of isophthalic acid with water is preferably performed at relatively low temperature, for example 50 to 150° F., although temperatures up to 300° F. or higher can be employed if desired. Elevated pressure can be employed if needed to maintain the normally liquid materials in the liquid state, although such elevated pressure is usually unnecessary.

The amount of water added is usually within the approximate range from 50 to 100 volumes per hundred volumes of alcohol solution of isophthalic acid. However any amount which is capable of bringing the composition within the two phase portion of the system can be employed.

The immiscible xylene layer which separates from the solution upon addition of water usually constitutes an amount within the approximate range from 0.25 to 3 volume percent, more often less than 1 volume percent, of the alcohol solution of isophthalic acid prior to addition of water.

Figure 2:
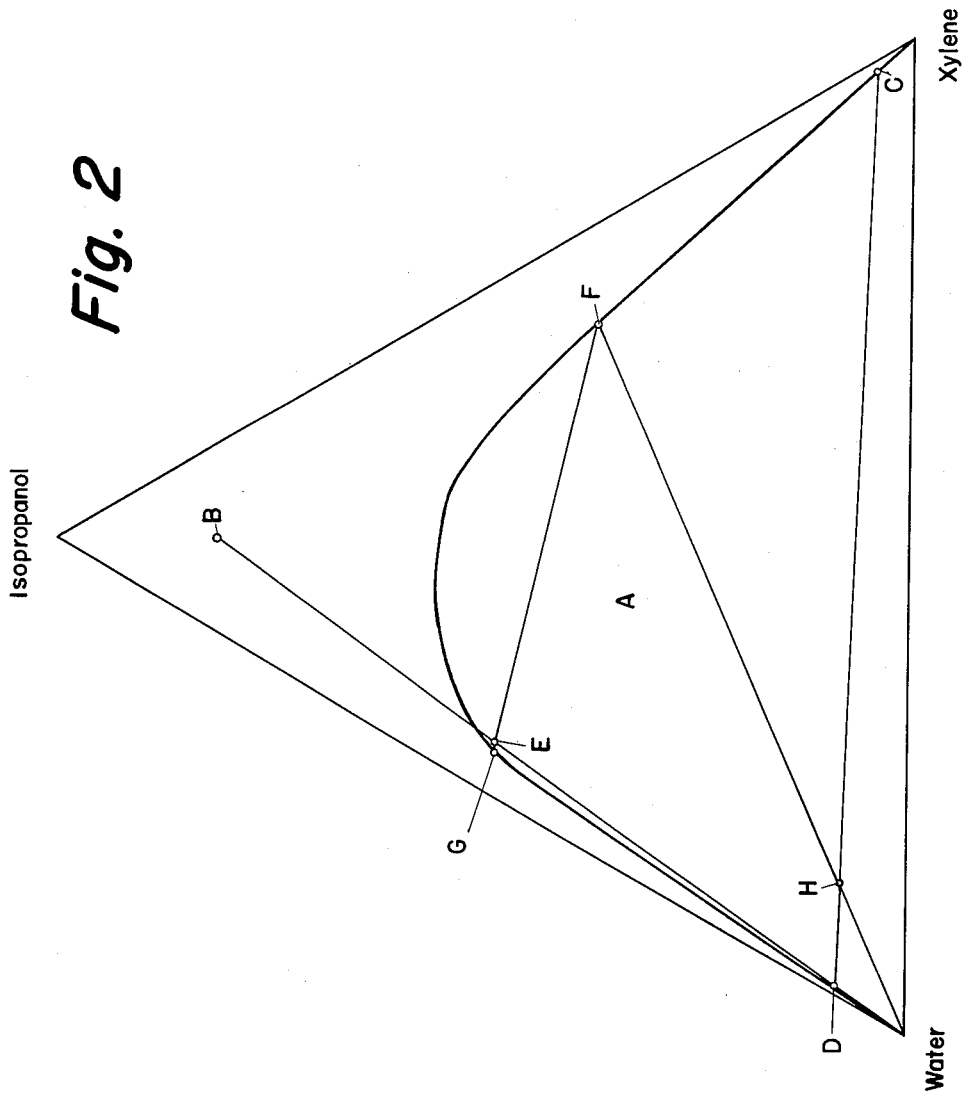

The invention will be further described with reference to the attached drawings wherein FIGURE 1 is a schematic flowsheet of one embodiment of the process according to the invention, and FIGURE 2 is a ternary diagram showing solubilities and phase relationships for the ternary system water-m-xylene-isopropanol. The following description of the drawings constitutes a specific example of one manner of carrying out the process according to the invention.

Referring to FIGURE 1, mixture of m-xylene and p-xylene is oxidized with oxygen gas in zone 10 at a temperature of about 300° F. and pressure of about 50 p.s.i.g. using cobalt naphthenate in amount to provide 0.05 weight percent of cobalt based on total xylene charge. The oxidation products contain about 60° isophthalic acid and about 40% terephthalic acid based on total phthalic acid product. The oxidation is performed in a continuous manner with removal of a portion of the oxidation mixture, addition of xylene to the removed material, and filtration of phthalic acids. The filtrate is recycled to the oxidation zone. The filtration is performed at room temperature. The phthalic acid filter cake is removed from the filter and agitated with isopropanol containing about 9 volume percent water at room temperature. About 30 weight units of aqueous isopropanol are employed per unit weight of total phthalic acids.

The products of this treatment are an alcohol solution of isophthalic acid and a solid phase constituting a terephthalic acid concentrate. The latter is filtered at room temperature in zone 13, and the alcohol solution of isophthalic acid is contacted in zone 14 with additional water. The amount of water added is about 75 volumes per 100 volumes of the alcohol solution of isophthalic acid. The latter solution prior to addition of water contains about 9 volume percent water and about 9 volume percent xylene based on total liquid and is saturated with isophthalic acid. In place of the filtration in zone 13, any other suitable means for separation of the liquid and solid phases can be employed, e.g. the means disclosed in the A. D. Moscrip and I. W. Mills patent application Serial No. 708,376 filed of even date herewith.

The addition of water in zone 14 causes the separation of a xylene layer constituting about ¾ percent of the alcohol solution of isophthalic acid priod to addition of water. This xylene layer, which is highly colored and contains a relatively small amount of dissolved alcohol and phthalic acid, is, in one embodiment introduced into zone 15, wherein it is contacted with about 4 volumes of additional water per 100 volumes of original alcohol solution of isophthalic acid. The water dissolves alcohol and phthalic acid from the xylenes. The resulting alcohol solution is introduced into zone 16 wherein alcohol is distilled off to produce as residue an aqueous slurry of an isophthalic acid concentrate having good color. The distillate material in line 18 comprises isopropanol, xylene and water and is recycled through means not shown to zone 12. As a result of the reduction in xylene content, this material is capable of functioning effectively in the separation of isophthalic acid from terephthalic acid.

The additional contacting of xylenes with water in zone 15 can be eliminated if desired. However, such contacting is preferred, since it reduces the total amount of water required, improves the separation between isophthalic acid and color, and increases the percent recovery of isophthalic acid. The solutions of isophthalic acid in alcohol produced in zones 14 and 15 respectively are preferably distilled together in zone 16.

FIGURE 2 is a ternary volume percent diagram for water-m-xylene-isopropanol at room temperature. The two phase region is designated by the letter A. The composition of a typical alcohol solution of isophthalic acid obtained in alcohol treatment of the phthalic acid filter cake is indicated by the letter B. Upon addition of water to the composition B, as in zone 14 of FIGURE 1, the composition is changed as indicated by the straight line from the point B to the water apex. When the composition has been brought within the two phase region, a separation can be effected between a xylene phase and an alcohol phase. The composition B contains sufficient xylene initially to permit entering the two phase region simply by adding water. In cases where the initial composition does not contain sufficient xylene to permit this, hydrocarbon as well as water is added in order to enter the two phase region.

Sufficient water having been added to reach point E, for example, xylene phase F and alcohol phase G are obtained upon separation of layers. The composition of these phases is determined by the tie-line FG. Upon separation of xylene phase F and contacting of the latter with additional water, as in zone 15 of FIGURE 1, the composition is changed as indicated by the straight line from the point F to the water apex. Sufficient water having been added to reach point H for example, xylene phase C and alcohol phase D are obtained, as determined by the tie-line CD.

The invention claimed is:
1. In a process for producing isophthalic acid wherein m-xylene is partially oxidized in liquid phase to obtain a reaction product comprising solid isophthalic acid, unoxidized liquid m-xylene and contaminating color bodies, and wherein a solid material comprising solid isophthalic acid, occluded liquid m-xylene and contaminating color bodies is separated from the free liquid in said reaction product and subsequently contacted with an aqueous lower alkanol thereby to produce a solution of the isophthalic acid in said aqueous alkanol, said solution also containing the occluded unoxidized xylene and contaminating color bodies, the improvement of: (1) separately contacting said solution, at a temperature in the approximate range of from about 50 to about 300° F., with an added agent selected from the group consisting of water, and both water and xylene, in amount sufficient to produce a two-phase liquid system; and (2) separating from the resulting two-phase liquid system a xylene-rich layer containing color bodies, whereby an aqueous-alkanol-rich solution of isophthalic acid containing reduced concentrations of xylene and color bodies is obtained.

2. Process according to claim 1 wherein said xylene-rich layer is further contacted with additional added water, thereby to obtain another two-phase liquid system, and the resulting second aqueous-alkanol-rich layer, containing isophthalic acid and further reduced concentrations of xylene and color bodies, is separated from the resulting second xylene-rich layer.

3. Process according to claim 1 wherein said reaction product also comprises solid terephthalic acid resulting from the liquid phase partial oxidation of p-xylene in admixture with said m-xylene, said solid terephthalic acid being subsequently separated from the said solution of the isophthalic acid in aqueous alkanol prior to the separate contacting of the said solution with said added agent.

4. Process according to claim 1 wherein said alkanol is isopropanol, and said solution prior to contacting with said added agent contains from about 5 to about 15 volume percent of water.

5. Process according to claim 1 wherein said added agent is both water and xylene, and said xylene is added in an amount sufficient to produce a xylene concentration of from about 5 to about 15 volume percent based on said solution prior to contacting with added water.

6. Process according to claim 1 wherein the amount of added water is from about 50 to about 100 volume percent of the amount of said solution.

7. Process according to claim 1 wherein the temperature of said contacting is in the range of from about 50 to about 150° F.

8. In a process for producing isophthalic acid, wherein a mixture of m-xylene and p-xylene is partially oxidized in liquid phase to obtain a reaction product comprising solid isophthalic acid, solid terephthalic acid, unoxidized liquid xylene isomers and contaminating color bodies, and wherein a solid material comprising solid phthalic acid isomers, occluded unoxidized liquid xylenes and contaminating color bodies is separated from the free liquid in said reaction product and subsequently contacted at a temperature in the range of from about 50 to about 300° F. with an aqueous alkanol containing from about 5 to about 15 volume percent of water, said contacting with aqueous alkanol being in a weight ratio of aqueous alkanol to solid material in the range of from about 10:1 to about 40:1, thereby to produce a solution of the isophthalic acid in said aqueous alkanol, said solution also containing contaminating color bodies and from about 5 to about 15 volume percent of unoxidized xylene isomers, the improvement of: (1) separately contacting said solution, at a temperature in the approximate range of from about 50 to about 300° F., with added water in an amount equal to about 50 to about 100 volume percent of said solution; and (2) separating from the resulting two-phase liquid system a xylene-rich layer containing color bodies, whereby an aqueous alkanol-rich solution of isophthalic acid containing reduced concentrations of xylene and color bodies is obtained.

References Cited in the file of this patent

UNITED STATES PATENTS

| | | |
|---|---|---|
| 2,245,528 | Loder | June 10, 1941 |
| 2,732,399 | Carlston et al. | Jan. 24, 1956 |
| 2,741,633 | McKinnis et al. | Apr. 10, 1956 |